United States Patent
Conroy et al.

(10) Patent No.: US 7,603,044 B1
(45) Date of Patent: Oct. 13, 2009

(54) POLARIZATION CONTROL FOR MULTICHANNEL AND POLARIZATION MULTIPLEXED OPTICAL TRANSPORT NETWORKS

(75) Inventors: Keith Conroy, Perkasie, PA (US); Omer Acikel, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/327,753

(22) Filed: Dec. 3, 2008

(51) Int. Cl.
*H04B 10/06* (2006.01)
(52) U.S. Cl. ............... 398/202; 398/208; 398/209; 398/152; 398/205; 398/206; 385/11
(58) Field of Classification Search .......... 398/147, 398/148, 149, 158, 159, 79, 65, 152, 202, 398/203, 204, 205, 206, 207, 208, 209, 210, 398/211, 212, 213, 214; 385/11
See application file for complete search history.

(56) References Cited

U.S. PATENT DOCUMENTS

2007/0092259 A1\* 4/2007 Bontu et al. ............ 398/147

\* cited by examiner

*Primary Examiner*—Hanh Phan
(74) *Attorney, Agent, or Firm*—Law Office of Gerald Maliszewski; Gerald Maliszewski

(57) ABSTRACT

A system and method are provided for calibrating orthogonal polarity in a multichannel optical transport network (OTN) receiver. The method accepts a composite signal and separates the polarization of the signal into a pair of $2^n$-phase shift keying ($2^n$-PSK) modulated input signals via Ix and Qx optical signal paths, where $n \geq 1$. Likewise, a pair of $2^p$-PSK modulated input signals are accepted via Iy and Qy optical signal paths where $p \geq 1$. Polarization-adjusted I'x, Q'x, I'y, and Q'y signals are generated. An average magnitude is compared to either 2×the absolute magnitude of (I'x and Q'x), or 2×the absolute magnitude of (I'y and Q'y). The average magnitude value can be used that is either 2×(a predetermined peak signal amplitude), or the sum of the absolute magnitudes of (I'x and Q'x) and (I'y and Q'y). The polarization-adjusted I'x, Q'x, I'y, and Q'y signals are modified until the magnitude comparison is about zero.

14 Claims, 6 Drawing Sheets

Fig. 1 *(PRIOR ART)*

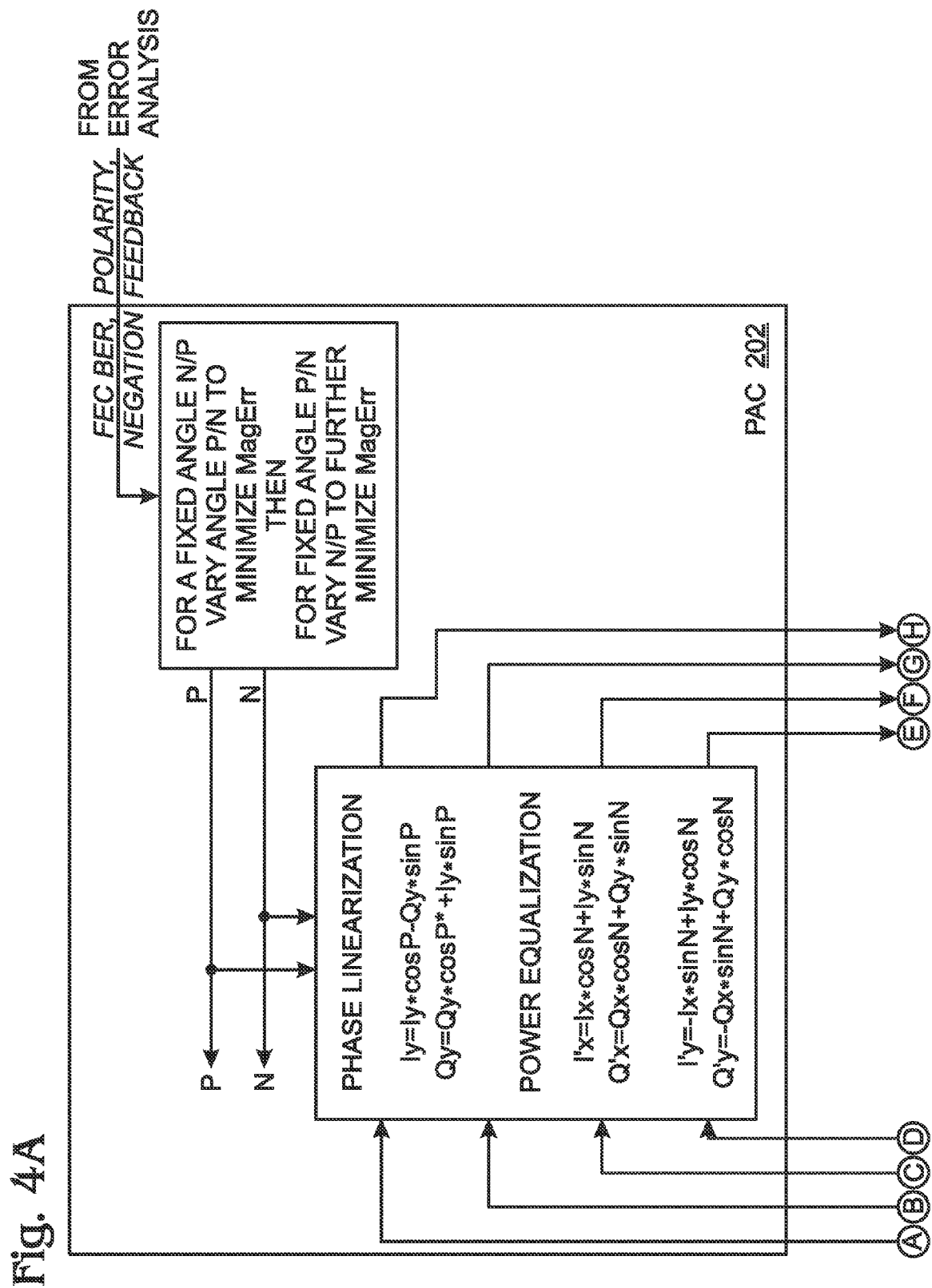

POLARIZATION CONTROL FOR MULTICHANNEL AND POLARIZATION MULTIPLEXED OPTICAL TRANSPORT NETWORKS

BACKGROUND OF THE INVENTION

1. Field of the Invention

This invention generally relates to signal communications and, more particularly, to a system and method for controlling polarization in a polarization multiplexed network using a multi-channel Optical Transport Network (OTN) protocol.

2. Description of the Related Art 100 gigabit per second (Gbps) OTN protocols are being developed where the OTN streams are carried in a "parallel fashion" at a bit-rate greater than 100 Gbps. Until recently, optical signals have been carried using modulations techniques carrying 1 bit per symbol. However, the need for faster signal speeds means that return to zero (RZ), non-return to zero (NRZ), and phase-shift keying (PSK) modulation techniques (1 bit per symbol) are no longer suitable.

Two complex envelope signals, such as 2 bits/sym quadrature phase-shift keying (QPSK) signals, can be formed to coexist in a medium such as fiber via polarization multiplexer, one in an X polarization and the other in the polarization. This bandwidth efficiency of such a composite signal is greater. When this composite signal travels in a medium such as a fiber, the state of polarization, i.e. the definition of X and Y polarizations, may not be the same for the receiver as the transmitter.

FIG. 1 is a schematic diagram depicting a system for the transmission of high speed signals (40/100 Gbps and above) using multiplexed orthogonal optical polarization, with 2 bits per symbol per polarization, for a total of 4 bits/symbol (prior art). Mach-Zehnder modulators (MZMs) convert electrical signals to optical signals, and phase shift is introduced between the I and Q signal paths. Any skew (differential time delay) experienced in the modulation of the transmitted signal is translated to the receiver, making the recovery of a serial stream from parallel streams difficult. Alternately but not shown, phase shift may be introduced before the electrical signals are converted to optical signals. After transmission, polarization errors may also be introduced.

It would be advantageous if technique could be developed to minimize errors due to changes in polarization in the transmission of composite polarized signals.

SUMMARY OF THE INVENTION

Disclosed herein are a system and method to separate and control polarization ambiguity of a polarization multiplexed modulated signal where within each polarization there is a complex envelope signal. The method is applicable to a real signal such as binary phase-shift keying (BPSK), and has even greater utility for constant envelope signals such as M-PSK. The control can be applied in the electrical domain after photodiode detection, or in the optical domain prior to the photodiode. As a result, complex envelope signals can be returned to their original form, as transmitted. With the addition of training and/or Forward Error Correction (FEC) feedback, potential polarization and negation ambiguities are resolved.

Accordingly, a method is provided for calibrating orthogonal polarity in a multichannel optical transport network (OTN) receiver. The method accepts a composite signal and separates the polarization of the signal into a pair of $2^n$-phase shift keying ($2^n$-PSK) modulated input signals via Ix and Qx optical signal paths, where $n \geq 1$. Likewise, a pair of $2^p$-PSK modulated input signals are accepted via Iy and Qy optical signal paths where $p \geq 1$. Polarization-adjusted I'x, Q'x, I'y, and Q'y signals are generated. An average magnitude is compared to either 2×the absolute magnitude of (I'x and Q'x), or 2×the absolute magnitude of (I'y and Q'y). The average magnitude value can be used that is either 2×(a predetermined peak signal amplitude), or the sum of the absolute magnitudes of (I'x and Q'x) and (I'y and Q'y). The polarization-adjusted I'x, Q'x, I'y, and Q'y signals are modified until the magnitude comparison is about zero.

The polarization-adjusted I'x, Q'x, I'y, and Q'y signals are generated by initially finding;

$Iy=Iy^*\cos P - Qy^*\sin P;$ $Qy=Qy^*\cos P + Iy^*\sin P;$ and, subsequently calculating:

$I'x=Ix^*\cos N + Iy^*\sin N;$ $Q'x=Qx^*\cos N + Qy^*\sin N;$ $I'y=-(Ix^*\sin N) + Iy^*\cos N;$ $Q'y=-(Qx^*\sin N) + Qy^*\cos N;$ and, The polarization-adjusted I'x, Q'x, I'y, and Q'y signals are modified by fixing as a constant either the P or N angle (the selected angle), and iteratively varying the unselected angle until a minimum magnitude comparison is obtained. Then, the unselected angle is fixed as a constant, and the selected angle is varied until the magnitude comparison is about zero.

Additional details of the above-described method and a system for calibrating orthogonal polarity in a multichannel optical transport network (OTN) receiver are described below.

BRIEF DESCRIPTION OF THE DRAWINGS

FIGS. 4A and 4B depict the systems of FIGS. 2 and 3 from an alternate perspective.

DETAILED DESCRIPTION

Figure 1:
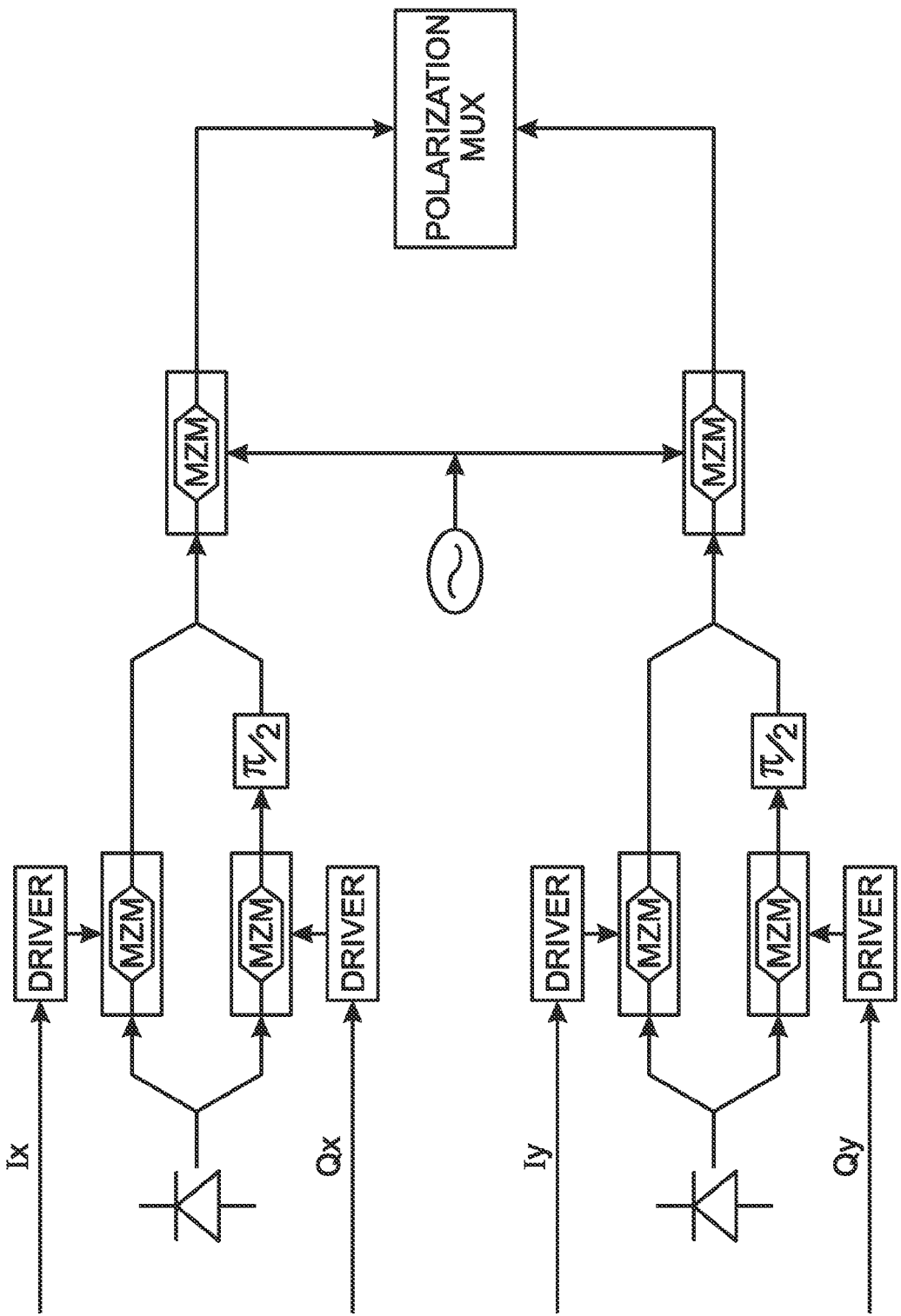
FIG. 1 is a schematic diagram depicting a system for the transmission of high speed signals (40/100 Gbps and above) using multiplexed orthogonal optical polarization, with 2 bits per symbol per polarization, for a total of 4 bits/symbol (prior art).
Figure 2:
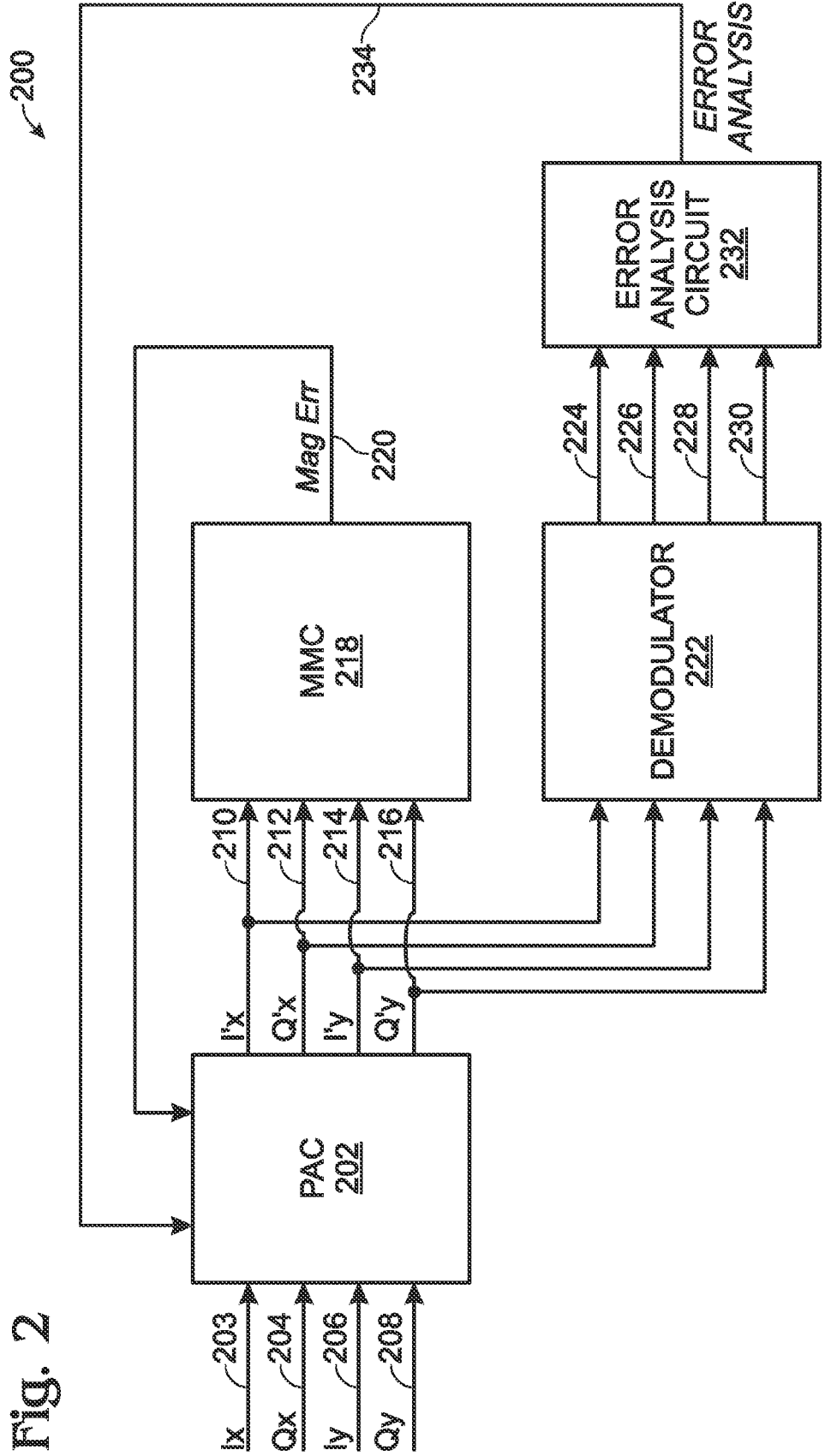
FIG. 2 is a schematic block diagram of a system for calibrating orthogonal polarity in a multichannel optical transport network (OTN) receiver.

FIG. 2 is a schematic block diagram of a system for calibrating orthogonal polarity in a multichannel optical transport network (OTN) receiver. The system 200 comprises a polarization adjustment circuit (PAC) 202 having an input on line 203 and 204 to accept a pair of $2^n$-phase shift keying ($2^n$-PSK) modulated input signals via Ix and Qx optical signal paths, respectively, where $n \geq 1$. Inputs on lines 206 and 208 accept a pair of $2^p$-PSK modulated input signals via Iy and Qy optical signal paths, respectively, where $p \geq 1$. For example, n and p may be equal to 2, so that QPSK signals are accepted.

The PAC 202 has an output on lines 210, 212, 214, and 216 to supply polarization-adjusted I'x, Q'x, I'y, and Q'y signals, respectively.

A magnitude measurement circuit (MMC) 218 has inputs on lines 210-216 to accept the polarization-adjusted I'x, Q'x, I'y, and Q'y signals. The MMC 218 compares an average magnitude to a "selected magnitude" that is either 2×the absolute magnitude of (I'x and Q'x), or 2×the absolute magnitude of (I'y and Q'y). The average magnitude is defined as either 2×(a predetermined peak signal amplitude), or the sum of the absolute magnitudes of (I'x and Q'x) and (I'y and Q'y). The MMC 218 supplies a magnitude comparison measurement signal (MagErr) on line 220. The PAC 202 accepts the magnitude comparison measurement signal on line 220 and modifies the polarization-adjusted I'x, Q'x, I'y, and Q'y signals until the magnitude comparison measurement, as represented by the signal on line 220, is about zero. For example, the MMC 218 may compare the magnitudes by subtracting the average magnitude from the selected magnitude.

The PAC 202 generates polarization-adjusted I'x, Q'x, I'y, and Q'y signals by initially finding;

$$Iy=Iy^*\cos P - Qy^*\sin P;$$

$$Qy=Qy^*\cos P + Iy^*\sin P;\text{ and,}$$

subsequently calculating:

$$I'x=Ix^*\cos N + Iy^*\sin N;$$

$$Q'x=Qx^*\cos N + Qy^*\sin N;$$

$$I'y=-(Ix^*\sin N) + Iy^*\cos N;$$

$$Q'y=-(Qx^*\sin N) + Qy^*\cos N;\text{ and,}$$

The PAC 202 modifies the polarization-adjusted I'x, Q'x, I'y, and Q'y signals until the magnitude comparison measurement is about zero by fixing as a constant either the P or N angle, which is defined as the selected angle. The PAC 202 iteratively varies the unselected angle until a minimum magnitude comparison measurement is obtained. Then, the PAC 202 fixes the unselected angle as a constant and varies the selected angle until the magnitude comparison measurement is about zero.

In one aspect, the system 200 further comprises a demodulator 222 having an input on lines 210-216 to accept polarization-adjusted I'x, Q'x, I'y, and Q'y signals and an output on lines 224, 226, 228, and 230 to supply demodulated the Ix, Qx, Iy, and Qy signals, respectively. An error analysis circuit 232 accepts the demodulated the Ix, Qx, Iy, and Qy signals on lines 224-230 and has an output on line 234 to supply an error analysis measurement signal.

The PAC 202 has an input on line 234 to accept the error analysis measurement signal. In response to errors in the demodulated I'x and Q'x signals greater than a predetermined threshold, the PAC 202 adds 180 degrees to the phase of either the I'x or Q'x signal, or both the I'x and Q'x signals. The selection of which signal to phase adjust may be a trial-and-error process of, for example, initially selecting just the I'x signal for the phase change. If the errors remain greater than the threshold, the 180 phase adjustment may be backed out of the I'x signal, and 180 degrees is added to the Q'x signal. If the errors still remain greater than the threshold, then a 180 phase adjustment may be to both the I'x and Q'x signals.

Likewise, in response to errors in the demodulated I'y and Q'y signals greater than the predetermined threshold, the PAC 202 adds 180 degrees to the phase of either the I'y or Q'y signal, or both the I'y or Q'y signals. In one aspect the PAC adds 180 degrees to the phase of a signal in response to errors in the demodulated optical signals greater than about 20%. However, the system is not limited to any particular threshold value.

The system 200 shown in FIG. 2 makes corrections in the optical domain. That is, the PAC 202 accepts Ix, Qx, Iy, and Qy optical signals and supplies polarization-adjusted I'x, Q'x, I'y, and Q'y optical signals. Likewise, the MMC 218 compares average magnitude optical signals to either 2×the absolute magnitude of (I'x and Q'x) optical signals, or 2×the absolute magnitude of (I'y and Q'y) optical signals.

Figure 3:
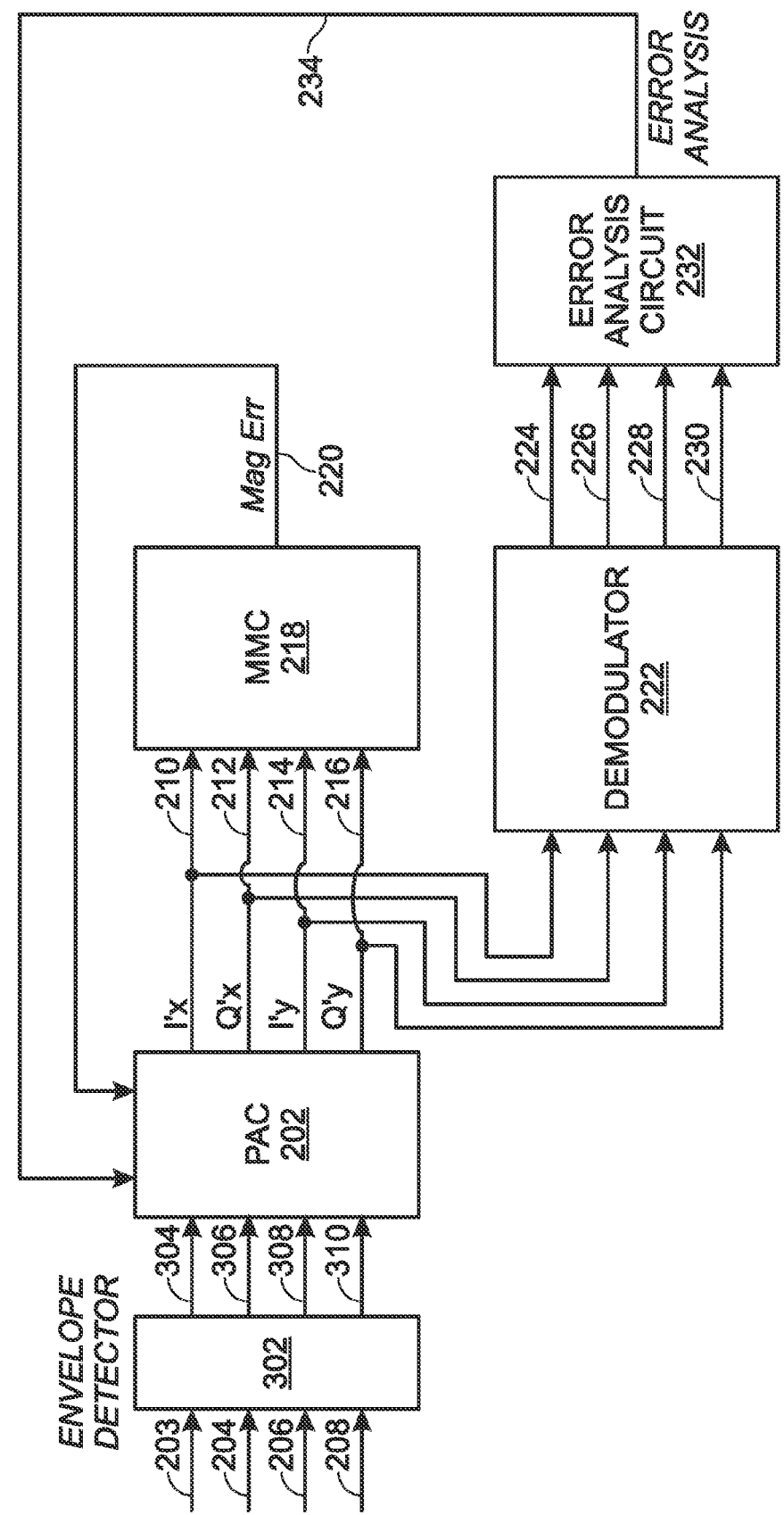
FIG. 3 is a schematic block diagram depicting a variation of the system for calibrating orthogonal polarity in a multichannel OTN receiver.

FIG. 3 is a schematic block diagram depicting a variation of the system for calibrating orthogonal polarity in a multichannel OTN receiver. In the system 300 depicted in FIG. 3, signal corrections are made in the electrical domain. An envelope detector 302 has an input on lines 203-208 to accept Ix, Qx, Iy, and Qy optical signals and outputs on lines 304, 306, 308, and 310 supply Ix, Qx, Iy, and Qy electrical signal amplitudes, respectively. In this aspect, the PAC 202 accepts Ix, Qx, Iy, and Qy electrical signal amplitudes on lines 304-310 and supplies polarization-adjusted I'x, Q'x, I'y, and Q'y electrical signals on lines 210-216, respectively.

The MMC 218 compares average magnitude electrical signals to either 2×the absolute magnitude of (I'x and Q'x) electrical signals, or 2×the absolute magnitude of (I'y and Q'y) electrical signals.

Functional Description

Figure 4B:
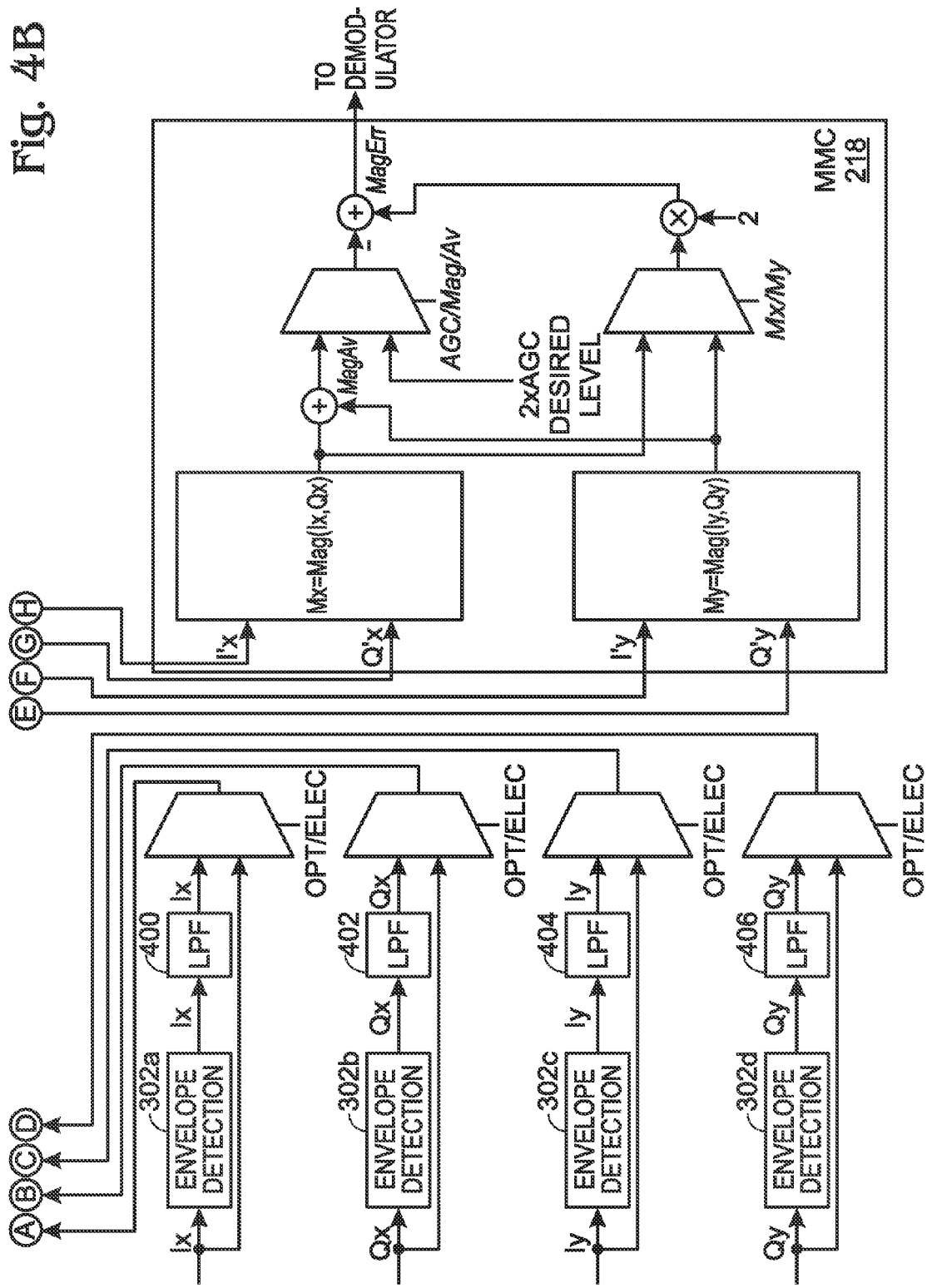

FIGS. 4A and 4B depict the systems of FIGS. 2 and 3 from an alternate perspective. It is assumed that there is Automatic Gain Control (AGC), not shown, for each channel Ix, Qx, Iy, and Qy. Each channel has an envelope detector that follows the signal level (amplitude) regardless of its polarity (+/−) and a low pass filter (400-406) to remove high frequency effects. If electrical control is selected, the PAC 202 removes contributions of channels from each other so the outputs I'x, Q'x, I'y, and Q'y are close to what they were at transmitter. This is done by calculating two angles: P and N. The angle P is associated with linear X and Y polarization. The angle N is used to make the power in each polarization equal. These two parameters are used regardless of whether the corrections are made in the electrical or optical domain.

The calculations of the angles P and N are trial-and-error, where the driving metric to find the right angle is based upon minimizing the magnitude error, MagErr, between the magnitude of X (or Y) polarization and either averaged magnitude of X and Y polarizations, or a desired level set by AGC. The angles are updated one at a time, i.e. first one angle is adjusted until MagErr cannot be minimized any further. Then, the other angle is adjusted until the MagErr cannot be minimized any further. The multiple rounds of one at a time minimizations can be applied to find best minimum for both angles.

The method is a simple and effective way of separating the polarizations X and Y in a polarization multiplex composite signal. In one aspect, the complex envelope signal is assumed to be a constant envelope. However, the algorithm can be applied to any multi-level signaling, as long as all constellation points are equally likely to occur during an observation period. That is, there is defined averaged constant envelope provided so that all constellation points are visited equally, as long as impairments are independent of the constellation points.

In some aspect, 180 degree phase shifts must be added to the polarization-adjusted I'x, Q'x, I'y, and Q'y signals. The example below shows why such an adjustment may be necessary.

Example Correction:

Assume that the transmission signal is: Ix=1, Qx=1, Iy=1, and Qy=1, or 1 1 1 1. It is also assumed that binary 0 is mapped to −1 in transmission, and 1 is mapped to 1. The constant envelope magnitude is Mx=My=the square root of 2 (sqrt(2))=sqrt($1^2+1^2$). It is further assumed by in the calculation of the minimum MagErr value, it is determined that Ix=−1, Qx=−1, Iy=1, and Qy=1. With these values, Mx=My=sqrt(2)(radius of constant envelope magnitude). In this case, AGC=sqrt(2) as well. So the PAC circuitry will drive P and N such that Mx=My=AGC. This correction sets the levels of Ix, Qx, Iy, and Qy to the right amplitude value, but with incorrect polarities (for Ix and Qx). That is, any of the following polarities produces the same minimum MagErr, Ix=+/−1, Iy=+/−1, Qx=+/−1, and Qy=+/−1.

If FEC is used and received signals are interpreted to be 0 0 1 1 received, a 50% error can be determined, since 1 1 1 1 was actually sent. Using the FEC, the polarity problem is recognized and the PAC switch Ix from −1 to +1, and Qx from −1 to +1. This change does not alter how MagErr is calculated, since Mx still equals sqrt(2).

Figure 5:
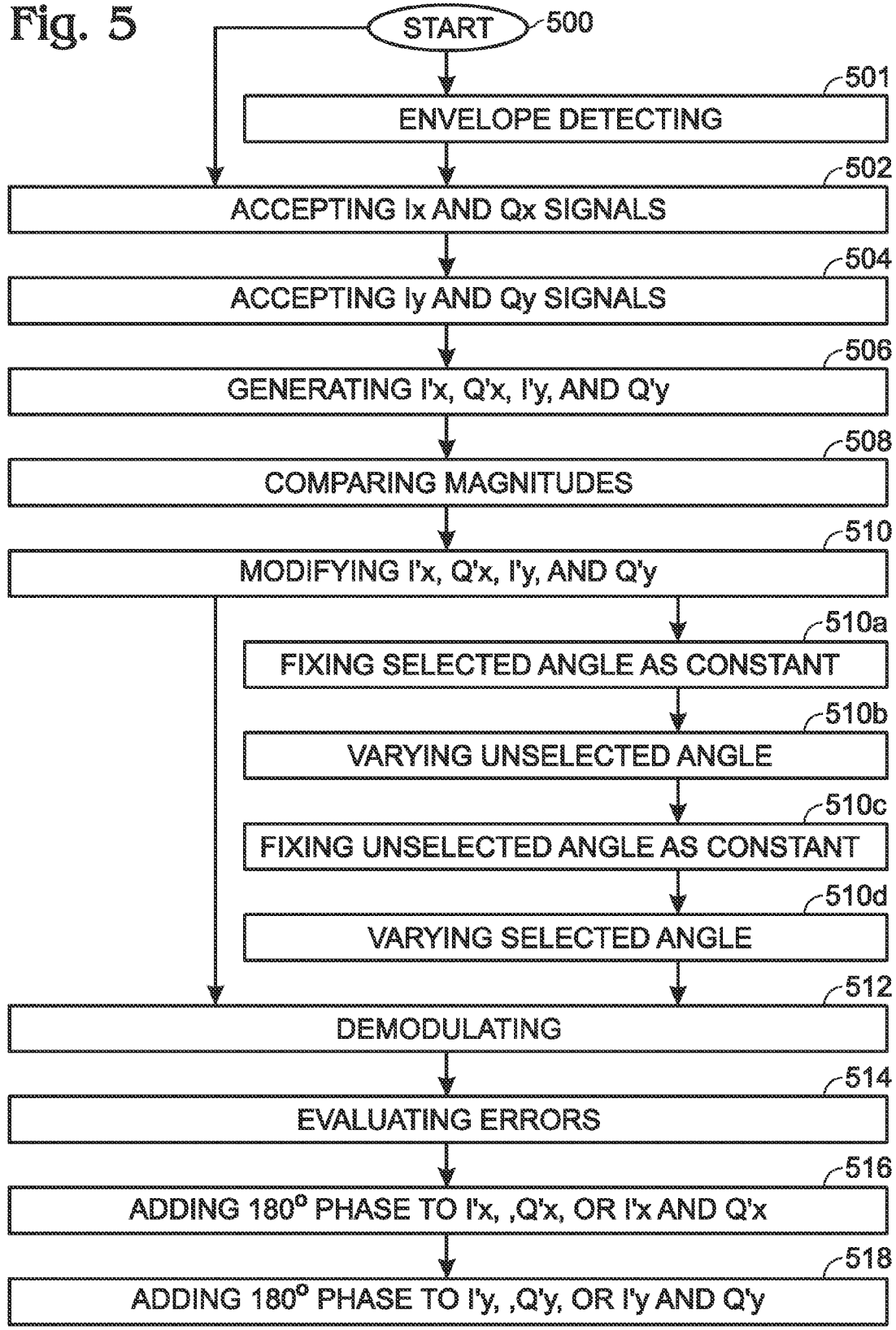
FIG. 5 is a flowchart illustrating a method for calibrating orthogonal polarity in a multichannel OTN receiver.

FIG. 5 is a flowchart illustrating a method for calibrating orthogonal polarity in a multichannel OTN receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 accepts a pair of $2^n$-phase shift keying ($2^n$-PSK) modulated input signals via Ix and Qx optical signal paths, where n≧1. Step 504 accepts a pair of $2^p$-PSK modulated input signals via Iy and Qy optical signal paths where p≧1. Step 506 generates polarization-adjusted I'x, Q'x, I'y, and Q'y signals. Step 508 compares an average magnitude to either 2×the absolute magnitude of (I'x and Q'x), or 2×the absolute magnitude of (I'y and Q'y), which is defined as the selected magnitude. In one aspect, the average magnitude is subtracted from the selected magnitude. The average magnitude is defined as either 2×(a predetermined peak signal amplitude), e.g., an AGC value, or the sum of the absolute magnitudes of (I'x and Q'x) and (I'y and Q'y). Step 510 modifies the polarization-adjusted I'x, Q'x, I'y, and Q'y signals until the magnitude comparison is about zero.

In one aspect, generating the polarization-adjusted I'x, Q'x, I'y, and Q'y signals in Step 506 includes initially finding;

$Iy=Iy*\cos P-Qy*\sin P;$ $Qy=Qy*\cos P+Iy*\sin P;$ and, subsequently calculating:

$I'x=Ix*\cos N+Iy*\sin N;$ $Q'x=Qx*\cos N+Qy*\sin N;$ $I'y=-(Ix*\sin N)+Iy*\cos N;$ $Q'y=-(Qx*\sin N)+Qy*\cos N;$ and, Then, modifying the polarization-adjusted I'x, Q'x, I'y, and Q'y signals until the magnitude comparison is about zero (Step 510) includes substeps. Step 510a fixes as a constant either the angle P or N, defined as the selected angle. Step 510b iteratively varies the unselected angle until a minimum magnitude comparison is obtained. Step 510c fixes the unselected angle as a constant, and Step 510d varies the selected angle until the magnitude comparison is about zero. Note: Steps 510a through 510d may be iterated a number of times.

In one aspect, subsequent to modifying the polarization-adjusted I'x, Q'x, I'y, and Q'y signals until the magnitude comparison is about zero, Step 512 demodulates the I'x, Q'x, I'y, and Q'y signals. Step 514 evaluates errors associated with the demodulated I'x, Q'x, I'y, and Q'y signals (e.g., using FEC or a training signal). In response to errors in the demodulated I'x and Q'x signals greater than a predetermined threshold, Step 516 adds 180 degrees to the phase of I'x, Q'x, or both I'x and Q'x.

In response to errors in the demodulated I'y and Q'y signals greater than the predetermined threshold, Step 518 adds 180 degrees to the phase of I'y, Q'y, or both I'y and Q'y. In one aspect, Steps 516 and 518 and 180 degrees in response to errors greater than about 20%.

In one aspect, generating polarization-adjusted I'x, Q'x, I'y, and Q'y signals in Step 506 includes generating polarization-adjusted I'x, Q'x, I'y, and Q'y optical signals. Then, comparing the average magnitude in Step 508 includes comparing average magnitude optical signals to a magnitude either 2×the absolute magnitude of (I'x and Q'x) optical signals, or 2×the absolute magnitude of (I'y and Q'y) optical signals.

Alternately, Step 501 envelope detects the Ix, Qx, Iy, and Qy optical signals to supply Ix, Qx, Iy, and Qy electrical signal amplitudes. Then, generating polarization-adjusted I'x, Q'x, I'y, and Q'y signals in Step 506 includes generating polarization-adjusted I'x, Q'x, I'y, and Q'y electrical signals. Comparing the average magnitude in Step 508 includes comparing average magnitude electrical signals to either 2×the absolute magnitude of (I'x and Q'x) electrical signals, or 2×the absolute magnitude of (I'y and Q'y) electrical signals.

A system and method have been provided for calibrating orthogonal polarity in a multichannel optical transport network (OTN) receiver. Explicit circuit details and process steps have been given as examples to illustrate the invention. However, the invention is not necessarily limited to these examples. Other variations and embodiments of the invention will occur to those skilled in the art.

We claim:

1. A method for calibrating orthogonal polarity in a multi-channel optical transport network (OTN) receiver, the method comprising:

accepting a pair of $2^n$-phase shift keying ($2^n$-PSK) modulated input signals via Ix and Qx optical signal paths, where n≧1;

accepting a pair of $2^p$-PSK modulated input signals via Iy and Qy optical signal paths where p≧1;

generating polarization-adjusted I'x, Q'x, I'y, and Q'y signals by initially finding:

$Iy=Iy*\cos P-Qy*\sin P;$ $Qy=Qy*\cos P+Iy*\sin P;$ and, subsequently calculating:

$I'x=Ix*\cos N+Iy*\sin N;$ $Q'x=Qx*\cos N+Qy*\sin N;$ $I'y=-(Ix*\sin N)+Iy*\cos N;$ $Q'y=-(Qx*\sin N)+Qy*\cos N;$ comparing an average magnitude to a magnitude selected from a group consisting of 2×the absolute magnitude of (I'x and Q'x) and 2×the absolute magnitude of (I'y and Q'y); and, modifying the polarization-adjusted I'x, Q'x, I'y, and Q'y signals until the magnitude comparison is about zero by:
  fixing as a constant an angle selected from a group consisting of P and N;
  iteratively varying the unselected angle until a minimum magnitude comparison is obtained;
  fixing the unselected angle as a constant; and,
  varying the selected angle until the magnitude comparison is about zero.

2. The method of claim 1 wherein comparing the average magnitude to the selected magnitude includes subtracting the average magnitude from the selected magnitude.

3. The method of claim 1 wherein comparing the average magnitude to the selected magnitude includes using an average magnitude selected from a group consisting of 2×(a predetermined peak signal amplitude) and the sum of the absolute magnitudes of (I'x and Q'x) and (I'y and Q'y).

4. The method of claim 1 further comprising:
  subsequent to modifying the polarization-adjusted I'x, Q'x, I'y, and Q'y signals until the magnitude comparison is about zero, demodulating the I'x, Q'x, I'y, and Q'y signals;
  evaluating errors associated with the demodulated I'x, Q'x, I'y, and Q'y signals;
  in response to errors in the demodulated I'x and Q'x signals greater than a predetermined threshold, adding 180 degrees to the phase of a member of a group consisting of one of the signals and both of the signals; and,
  in response to errors in the demodulated I'y and Q'y signals greater than the predetermined threshold, adding 180 degrees to the phase of a member of a group consisting of one of the signals and both of the signals.

5. The method of claim 4 wherein adding 180 degrees to the members in response to errors in the demodulated optical signals includes adding 180 degrees in response to errors greater than about 20%.

6. The method of claim 1 wherein generating polarization-adjusted I'x, Q'x, I'y, and Q'y signals includes generating polarization-adjusted I'x, Q'x, I'y, and Q'y optical signals; and,
  wherein comparing the average magnitude includes comparing average magnitude optical signals to a magnitude selected from a group consisting of 2×the absolute magnitude of (I'x and Q'x) optical signals and 2×the absolute magnitude of (I'y and Q'y) optical signals.

7. The method of claim 1 further comprising:
  envelope detecting the Ix, Qx, Iy, and Qy optical signals to supply Ix, Qx, Iy, and Qy electrical signal amplitudes;
  wherein generating polarization-adjusted I'x, Q'x, I'y, and Q'y signals includes generating polarization-adjusted I'x, Q'x, I'y, and Q'y electrical signals; and,
  wherein comparing the average magnitude includes comparing average magnitude electrical signals to a magnitude selected from a group consisting of 2×the absolute magnitude of (I'x and Q'x) electrical signals and 2×the absolute magnitude of (I'y and Q'y) electrical signals.

8. A system for calibrating orthogonal polarity in a multi-channel optical transport network (OTN) receiver, the system comprising:
  a polarization adjustment circuit (PAC) having an input to accept a pair of $2^n$-phase shift keying ($2^n$-PSK) modulated input signals via Ix and Qx optical signal paths, where $n \geq 1$, an input to accept a pair of $2^p$-PSK modulated input signals via Iy and Qy optical signal paths where $p \geq 1$, and an output to supply polarization-adjusted I'x, Q'x, I'y, and Q'y signals by initially finding:

$Iy = Iy^* \cos P - Qy^* \sin P;$ $Qy = Qy^* \cos P + Iy^* \sin P;$ and, subsequently calculating:

$I'x = Ix^* \cos N + Iy^* \sin N;$ $Q'x = Qx^* \cos N + Qy^* \sin N;$ $I'y = -(Ix^* \sin N) + Iy^* \cos N;$ $Q'y = -(Qx^* \sin N) + Qy^* \cos N;$ a magnitude measurement circuit (MMC) having an input to accept the polarization-adjusted I'x, Q'x, I'y, and Q'y signals, the MMC comparing an average magnitude to a magnitude selected from a group consisting of 2×the absolute magnitude of (I'x and Q'x) and 2×the absolute magnitude of (I'y and Q'y), and supplying a magnitude comparison measurement signal; and,
  wherein the PAC accepts the magnitude comparison measurement signal and modifies the polarization-adjusted I'x, Q'x, I'y, and Q'y signals until the magnitude comparison measurement is about zero by:
    fixing as a constant an angle selected from a group consisting of P and N;
    iteratively varying the unselected angle until a minimum magnitude comparison measurement is obtained;
    fixing the unselected angle as a constant; and,
    varying the selected angle until the magnitude comparison measurement is about zero.

9. The system of claim 8 wherein the MMC compares the average magnitude to the selected magnitude by subtracting the average magnitude from the selected magnitude.

10. The system of claim 8 wherein the MMC uses an average magnitude selected from a group consisting of 2×(a predetermined peak signal amplitude) and the sum of the absolute magnitudes of (I'x and Q'x) and (I'y and Q'y).

11. The system of claim 8 further comprising:
  a demodulator having an input to accept polarization-adjusted I'x, Q'x, I'y, and Q'y signals and an output to supply demodulated the Ix, Qx, Iy, and Qy signals;
  an error analysis circuit having an input to accept the demodulated the Ix, Qx, Iy, and Qy signals and an output to supply an error analysis measurement signal;
  wherein the PAC has an input to accept the error analysis measurement signal, and in response to errors in the demodulated I'x and Q'x signals greater than a predetermined threshold, adding 180 degrees to the phase of a member of a group consisting of one of the I'x and Q'x signals and both, and in response to errors in the demodulated I'y and Q'y signals greater than the predetermined threshold, adding 180 degrees to the phase of a member of a group consisting of one of the I'y and Q'y signals and both.

12. The system of claim 11 wherein the PAC adds 180 degrees to the phase of the members in response to errors in the demodulated optical signals greater than about 20%.

13. The method of claim 8 wherein the PAC accepts Ix, Qx, Iy, and Qy optical signals and supplies polarization-adjusted I'x, Q'x, I'y, and Q'y optical signals; and,
  wherein the MMC compares average magnitude optical signals to a magnitude selected from a group consisting of 2×the absolute magnitude of (I'x and Q'x) optical signals and 2×the absolute magnitude of (I'y and Q'y) optical signals.

14. The system of claim 8 further comprising:
an envelope detector having an input to accept Ix, Qx, Iy, and Qy optical signals and an output to supply Ix, Qx, Iy, and Qy electrical signal amplitudes;
wherein the PAC accepts Ix, Qx, Iy, and Qy electrical signal amplitudes and supplies polarization-adjusted I'x, Q'x, I'y, and Q'y electrical signals; and,
wherein the MMC compares average magnitude electrical signals to a magnitude selected from a group consisting of 2×the absolute magnitude of (I'x and Q'x) electrical signals and 2×the absolute magnitude of (I'y and Q'y) electrical signals.

* * * * *